United States Patent [19]

Whatley, Sr.

[11] Patent Number: 5,782,988
[45] Date of Patent: Jul. 21, 1998

[54] RAPID VEHICLE WASHING PROCESS

[76] Inventor: William J. Whatley, Sr., 1077 Race St., Apt. 1504, Denver, Colo. 80206

[21] Appl. No.: 674,290

[22] Filed: Jul. 2, 1996

Related U.S. Application Data

[63] Continuation-in-part of Ser. No. 402,779, Mar. 9, 1995, abandoned, which is a continuation-in-part of Ser. No. 199,796, Feb. 22, 1994, abandoned, which is a division of Ser. No. 6,750, Jan. 21, 1993, Pat. No. 5,363,868.

[51] Int. Cl.$^6$ .................................. B08B 7/04; B08B 3/02
[52] U.S. Cl. .................................. 134/18; 134/34; 134/42
[58] Field of Search .................................. 134/18, 22.12, 134/26, 28, 29, 32, 34

[56] References Cited

U.S. PATENT DOCUMENTS

| | | | |
|---|---|---|---|
| 1,183,391 | 5/1916 | Mason | 134/123 |
| 3,038,481 | 6/1962 | Brechtel | 134/123 X |
| 3,190,297 | 6/1965 | Austin et al. | 134/123 |
| 3,256,019 | 6/1966 | Bellas et al. | 134/123 X |
| 3,259,138 | 7/1966 | Heinicke | 134/181 X |
| 3,339,565 | 9/1967 | Williams | 134/180 X |
| 3,409,030 | 11/1968 | Schmidt | 134/123 |
| 3,658,590 | 4/1972 | Huebner et al. | 134/32 |
| 3,660,150 | 5/1972 | Larking, Jr. | 134/123 X |
| 4,288,255 | 9/1981 | Burger | 134/32 X |
| 4,715,391 | 12/1987 | Scheller | 134/123 X |
| 4,739,779 | 4/1988 | Jones et al. | 134/123 X |
| 4,857,113 | 8/1989 | Hudge | 134/2 |
| 5,033,489 | 7/1991 | Ferre et al. | 134/123 X |

*Primary Examiner*—Jill Warden
*Assistant Examiner*—Saeed Chaudhry

[57] ABSTRACT

The process for rapidly washing vehicles accumulates one or more of the requisite cleaning liquids under pressure prior to their use and subsequently rapidly releases them to wash the vehicle. Inherent in the process is the forceful impingement of water upon a vehicle to scour dirt therefrom. The impingement water is released at a high flow rate through a multitude of nozzles arrayed and directed so that selected exterior surfaces of the vehicle are rapidly and forcefully impinged upon. Other requisite liquids may also be applied at high flow rates, thus substantially reducing the time needed to wash a vehicle and improving the economy of operation.

8 Claims, No Drawings

RAPID VEHICLE WASHING PROCESS

SPECIFICATION

CROSS REFERENCE TO RELATED CASES

This is a continuation-in-part of Ser. No. 08/402,779, Filed Mar. 9, 1995 now abandoned, which is a continuation-in-part of application Ser. No. 08/199,796, filed Feb. 22, 1994 now abandoned, which is a Divisional of application Ser. No. 08/006,750, filed Jan. 21, 1993 now U.S. Pat. No. 5,363,868. This continuation-in-part specifies and claims the process utilized by the RAPID VEHICLE WASHER SYSTEM, U.S. Pat. No. 5,363,868, but is not limited to use with that washer apparatus.

BACKGROUND

1. Field of Invention

The present invention relates generally to the operation of automatic vehicle washers and more particularly to vehicle wash systems that employ water impingement to scour contaminates, chemicals, dirt, and grime from a vehicle.

2. Description of prior Art

Most washers for a stationary vehicle include a bay and a moving track mounted gantry that "rolls over" the vehicle or an overhead mounted arm that moves around the vehicle, either of which serve to support and direct the nozzles discharging liquids onto the vehicle. Many such wash systems clean by impinging water upon the vehicle to scour the dirt off rather than using friction materials which rub against the vehicle. A vehicle, such as a car, truck, or bus is positioned within the bay, and the gantry or arm moves between its front and rear while a cleanser is sprayed on the vehicle one or more times. Following this, a pump pressurizes water to impinge upon and scour the vehicle. Such designs are intended to minimize electric and water service requirements which are often a major cost of installation. To achieve this economy, pumps are sized small; the moving gantry or arm supporting the discharge nozzles serves to concentrate all of their output onto a small portion of the vehicle being washed. The pumps supplying cleansers run only while the cleansers are being applied. The high pressure pumps run only while supplying impingement water onto the vehicle, therefore, the various pumps run intermittently during the wash program. The time required for the gantry or arm to traverse its route over or around the vehicle applying these cleansers and impingement water is economically undesirable in that it reduces the number of vehicles that can be washed in any given period of time. As an example, a typical impingement type washer apparatus, as is commonly used, requires about one minute to apply cleansing agent, another minute to apply the impingement water, and usually another minute to rinse and apply wax to the vehicle. The pump supplying the impingement water only operates for one minute out of three as do the cleansing agent and rinse pumps.

The process for which applicant seeks letters patent utilizes a concept of accumulating liquid under pressure for subsequent release and incorporates this concept into a new, novel and unique method of rinsing vehicles that combines such liquid accumulation with forceful impingement of the liquid through a multitude of nozzles at a high flow rate upon a vehicle to scour dirt and grime therefrom. Although a multitude of vehicle washer designs and patents are known in the prior-art, this combination has never been proposed or applied to the washing of vehicles.

ADVANTAGES OF THE PROCESS

While the use of pressurized water is common to many state-of-the-art apparatus, none utilize a process, as is the subject of this application, that accumulates substantially all of the impingement water prior to its use and subsequently releases it at a high rate of flow to rinse a vehicle rapidly.

The new accomplishments of the Rapid Vehicle Washing Process are:

1. To simplify the equipment needed to wash a vehicle.

2. To substantially improve the economy of operation of vehicle washers.

3. To reduce electrical consumption per vehicle washed.

4. The improvement of air quality by reducing engine emissions.

5. To rapidly apply precise amounts of water, thus using water efficiently with a minimum of waste.

The Rapid Vehicle Washing Process allows for a versatility of usages. When an adequate water and electrical supply is available, such as would be found at existing impingement washer installations, the time required to wash a vehicle can be substantially reduced. However, the versatility of the process would allow a wash program to function at locations with restricted water and/or electrical service by reducing the pump capacity and increasing the time between vehicle washes. As an example, a washer using this process for the rinse cycle might use a 25 h.p. pump requiring a 36 GPM water supply and wash a vehicle in 45 seconds; with restricted water or electric service, it might use a 7 h.p. pump requiring an 8 GPM water supply and wash a vehicle in four minutes.

When used for the fastest obtainable wash, the process utilizes a large number of nozzles directed and manipulated to concurrently impinge with force upon selected surfaces of the vehicle. This plurality of nozzles might be mounted on interconnected pipes having little or no directed motion, thus eliminating the extensive mechanisms required of "roll over" or circling arm type washers and, therefore, simplifying the apparatus.

Economy of operation is improved by the Rapid Vehicle Washing Process because more than four times as many vehicles may be washed in a given time period. As an example, the following table compares the time required by a typical prior-art wash apparatus to the time required by the Rapid Vehicle Washing Process to wash an automobile, van, or small truck.

| Function | FAST WASH MODE TIME OF OPERATION | |
|---|---|---|
| | Prior-art washer | Rapid Vehicle Washing Process |
| Enter wash | 10 seconds | 10 seconds |
| Apply 5 gal. cleanser | 60 seconds | 6 seconds |
| Dwell time | 0 seconds | 11 seconds |
| Impinge 26 gallons | 60 seconds | 4 seconds |
| Rinse (5 gal.) | 60 seconds | 4 seconds |
| Exit wash | 10 seconds | 10 seconds |
| Total Time | 200 seconds | 45 seconds |

Both wash programs used the same amount of cleanser, impingement water, and rinse water. Both washes allowed the same amount of time for a vehicle to enter and exit the wash. Both washers used the same size pump and pump motor.

The impingement water pump of the prior-art washers runs for about 60 seconds out of the 200 seconds required to wash a vehicle; the Rapid Vehicle Washing Process pump runs continuously when cars are in line waiting to enter the wash and during departure from the wash, thus saving electrical energy. As an example of this energy saving, 32 gallons per minute sprayed at 1000 p.s.i. usually requires a 25 horse power pump motor; this motor, wired 240 volt-3 phase, will draw about 365 amperes to start the pump but only 68 amperes once it is running (NEMA Standards MGI-12.34 January 1984). If the prior-art washers operate at full capacity for 4 hours a day, the 25 hp pump will start 72 times. The Rapid Vehicle Washing Process will only start the pump once and wash the 72 cars in one hour and 12 minutes, thus saving energy and lowering the cost of operation.

An additional benefit of the Rapid Vehicle Washing Process is a decrease in air pollution due to vehicle engine emissions; customers spend less time waiting in line to be washed with their engines idling.

Thus, the Rapid Vehicle Washing Process provides these new, superior, and unexpected results:

Improved economy of operation.

Electrical energy savings.

Decreased air pollution.

More efficient use of water

SUMMARY OF THE INVENTION

The present invention is a process to rapidly and economically rinse vehicles such as automobiles, trucks, or busses, usually as part of a total washing operation. The essence of the process is the use of pressurized vessels in which at least one of the liquids used in rinsing a vehicle is stored or accumulated prior to its use, and is released at a high rate of flow through a plurality of nozzles to rapidly and forcefully impinge upon a vehicle, thus scouring and scrubbing dirt and grime therefrom. This rapid discharge takes place in much less time than was required to accumulate the liquid prior to its use; this resultes in an overall shortening of the washing operation while applying the same amount of impingement water.

DESCRIPTION OF THE PROCESS

The Rapid Vehicle Washing Process accumulates the majority of the impingement water used in an impingement type vehicle wash prior to its use in the wash program. This impingement water is accumulated in one or more vessels at a volume and pressure of at least 200 pounds per square inch predetermined to be sufficient to impinge with force upon the vehicle being washed. The vessels in which this water is accumulated must have a cavity, or be connected to separate vessels, having the capacity to store air or other gas at a volume at least four times that of the water being accumulated and at such pressures in excess of 200 pounds per square inch (p.s.i.) as have been determined to be sufficient to expel the accumulated water through a multitude of communicating spray nozzles sufficient to forcefully impinge upon those surfaces of a vehicle as have been selected to be washed. The vessels in which the water is contained must have both high and low water sensors communicated with the electronic controller and the gas cavity or gas containing vessels must have pressure sensors similarly communicated with the controller which, in turn, is communicated with controllable valves between the gas vessels and the water vessels and the controllable discharge valves on the water vessels. In addition, the water vessels may have a one-way check valve allowing gas flow from them into the gas receiver tanks and another valve connecting them to the receiver tank of a conventional low pressure air compressor.

The force of the impingement water is determined by the relation of the volume of water to the pressure applied to it, e.g., low volume at high pressure or high volume at lower pressure. As an example, 27 gallons sprayed at 1000 p.s.i. would have approximately the same impingement force as 130 gallons sprayed at 200 p.s.i..

A mechanism, usually a pump, must be provided to inject the water into the pressure vessel(s) and a way must be provided to furnish the compressed air necessary to expel the accumulated liquid. One example of such a way would be an automatic valve to let water into the vessel and a very high pressure air or gas compressor with receiver tanks to furnish the compressed gas. Another method might use a high pressure water pump filling the water vessel that is connected with check valves to a separate air or gas receiver tank which receives the air displaced by filling the water vessel. The operation of this method will become clear as this narrative progresses.

OPERATION OF THE PROCESS

The novel impingement process inherent in this invention is usually one cycle of a complete cleaning program of a stationary vehicle, but may be utilized as a single step cleaning/rinsing operation for the removal of contaminates from a vehicle. Substantially all of the water to be forcefully impinged upon the vehicle is stored in at least one vessel prior to its use. A gas, usually air, is stored under a pressure of at least 200 p.s.i. and at a volume of at least four times the volume of water to be impinged upon the subject vehicle; such pressure and volume of the stored gas are a minimum requirements to effectively force the impingement of the water upon the vehicle. When the impingement cycle of the wash is called for by the electronic controller, this gas is communicated with the water by at least one controllable valve and the water is released from its vessel by another at least one controllable valve that is communicated with a plurality of nozzles directed and manipulated to impinge upon all selected surfaces of the subject vehicle in less than one fifth the time that was required to store it under pressure. As the water vessel becomes empty, a sensor communicates with the controller which then communicates with the controllable valves to close them, thus preventing the loss of the gas or air through the nozzles and minimizing air absorption by the water in the water vessel and resulting pressure loss.

Similarly, the lower pressure cleanser liquids, waxes, and/or demineralized rinse water may be accumulated in pressurized tanks prior to their release at a high flow rate onto the vehicle being washed.

When the wash is busy and has vehicles lined up waiting to be washed, the mechanisms for accumulating and pressurizing the requisite liquids, and in particular the water for impingement purposes, will be sized to operate continuously filling the liquid vessel(s) and air cavities or receivers within the time frame of one wash cycle so that the impingement water and other requisite liquids are available for release upon every vehicle being washed within less than one fifth the total time of a wash cycle.

A typical cycle of the Rapid Vehicle Washing Process:

In this example the process is used to very rapidly rinse a vehicle using high flow rates. The flow rates of the impingement water in this example would be approximately 390 GPM at 1200 to 800 p.s.i., thus impinging 26 gallons of water in 4 seconds or 13 gallons in 2 seconds. In general, however, flow rates may vary from less than 200 GPM to in excess of 2400 GPM with pressures varying from 200 p.s.i. to in excess of 2000 p.s.i., with even higher flow rates and discharged gallonage in washers for larger vehicles such as busses and trucks.

The wash cycle is controlled by any of a variety of electronic programmable controllers as are well known in this art. The driver of the vehicle to be washed starts the process by activating this controller, usually through a money or code receiving device, as is well known in this art.

The water for impingement has been, for the most part, accumulated in vessels either pressurized by a gas such as air or communicated with another vessel containing such gas. If the accumulated water is of insufficient volume or pressure, the accumulation process will start or proceed if already operating.

The vehicle is driven into the wash bay and stopped at a predetermined point. At this time, a lower body rocker panel wash and/or undercarriage wash, as are well known in the prior-art, may be applied to the vehicle.

Once positioned in the wash apparatus, a cleansing agent is rapidly applied to the front, sides, rear, and top surfaces of the vehicle through a plurality of nozzles of sufficient number and directed to cover all of the aforementioned surfaces.

Next, a dwell time may be allowed for the cleanser to react with the dirt and grime on the vehicles surface.

When called for by the electronic controller, the accumulated water is rapidly released from the pressure vessel(s) to forcefully impinge upon and scour the front, sides, top, and rear of the subject vehicle. The following steps illustrate the impingement rinse process:

1. The controller signals the controllable valve between the gas or air receiver tank and the water vessel to open, thus pressurizing the water vessel.
2. Simultaneously, the controller signals the high pressure pump to operate and the controllable discharge valve on the water containing vessel to open, allowing the water to communicate with a plurality of nozzles directed and manipulated to cover all of the selected external surfaces of the vehicle in a time frame of less than one fifth the time that was required to accumulate the water in the pressurized vessels prior to its use.
3. When the low water sensors in the water vessels activate, they communicate with the controller which, in turn, communicates with the controllable discharge valves on the water vessel and the controllable valves between the water vessel and the air receiver tank causing them to close; this prevents the loss of air or gas through the nozzles and effectively separates the water vessels from the air receiver tanks.
4. The high pressure pump, which has been running during steps 1, 2, and 3, now refills the water vessel, forcing the gas therein through one way check valves into the air receiver tanks, thus increasing the pressure in them.
5. When the high water sensor activates and communicates with the controller, signaling that the water tank is full, the following steps occur.
    a. If there are cars waiting to enter the wash bay, the controller communicates with a by pass valve on the pump discharge side allowing the pumped water to bypass the water vessel, or
    b. If there are no cars waiting to be rinsed, it shuts down the high pressure pump, unless 1) The pressure sensor in the gas or air receiver tank indicates a lower than desired predetermined pressure, in which case
2) The pump continues to run, and
3) The controller communicates with the controllable discharge valve on the water vessel and the pump by-pass valve to open, but does not open the controllable valve between the water vessel and gas or air receiver tank, and
4) Low pressure air is injected into the air cavity in the water vessel through a controllable valve communicated with a conventional low pressure air compressor at pressures less than 200 p.s.i., thus forcing the water therein out of the water vessel, and
5) When the low level water sensor activates and communicates with the controller, the controller communicates with the discharge valve opened in step 3) above to close and simultaneously closes the pump by-pass valve, thus causing the water vessels to be refilled, and
6) The air therein is forced through a one way check valve into the air receiver tank, thus increasing the pressure therein, and
7) Steps 1) through 6) may be repeated as long as or whenever the pressure sensor in the air receiver tank indicates lower than desired pressure, thus causing a build up of pressure in the air receiver until an acceptable pressure is obtained.
8) Should a vehicle attempt to enter the wash bay, the controller will not authorize a wash program while steps 1) through 6) are in progress.

In a slightly different version of the impingement rinse process, a high pressure air or gas compressor capable of compressing the gas to a predetermined pressure in excess of 200 p.s.i. is used to furnish the pressurized air or gas to expel the impingement water from its vessel. The length of time required to wash a vehicle is determined by the time required to fill the liquid vessel and regenerate the required air pressure. The steps illustrating the impingement process using a high pressure air compressor are:

1. The controller signals the controllable valve between the gas or air receiver tank of the high pressure compressor and the water vessel to open, thus pressurizing the water vessel.
2. Simultaneously, the controller signals the controllable discharge valve on the water containing vessel to open, allowing the water to communicate with a plurality of nozzles directed and manipulated to cover all of the selected external surfaces of the vehicle in a time frame of less than one fifth the time that was required to accumulate the water in the pressurized vessels and repressurize the air.
3. When the low water sensors in the water vessels activate, they communicate with the controller which, in turn, communicates with the controllable discharge valves on the water vessel and the controllable valves between the water vessel and the air receiver tank causing them to close, thus preventing the loss of air or gas through the nozzles and effectively separating the water vessels from the air receiver tanks.
4. The controller opens a relief valve on the liquid vessel allowing its internal pressure to return to atmospheric pressure.
5. Water is now injected into the water vessel by a pump or a valve connected to a water main forcing the air in it out through the relief valve.

6. When the high water sensor activates and communicates with the controller, signaling that the water tank is full, the controller causes the relief valve on the liquid vessel to close and the pump or water main to stop injecting water into the vessel.

All other functions of the wash cycle are the same as when a high pressure water pump is used to generate the requisite air or gas pressure.

In either of the above described methods of furnishing compressed air to pressurize the water vessels, the air cavity in the water vessel may be separated from the water by an elastomer material or a fluid substance impervious to air. This will prevent or reduce air absorption by the water and a resultant loss of pressure.

Following this high pressure scouring process, an optional fresh water rinse may be applied. This rinse may alternately be a liquid wax application, demineralized water, or a drying agent if a blower/dryer is used in conjunction with this process.

The preceding descriptions are an examples of typical wash process for conventional automobiles, vans, and light trucks. Numerous variations of the process may be necessary or desirable with changing vehicle sizes, available water supply, electrical service size, local soil types, or other factors. As an example, where a location has insufficient water supply or electrical service to allow rapid accumulation of liquid in the pressure vessels, the time of discharge from the pressure vessels might be less than one-tenth the time that was required to fill them. Conversely, where there is an abundant water supply and electrical service and large vehicles such as trucks, busses, train cars, or airplanes are being washed, the time of discharge might be at least one-half of the time that was required to accumulate the water prior to its release.

The process described herein of accumulating impingement water in at least one pressure vessel may also be used solely as a cleaning/rinsing process to quickly remove grime and/or corrosive materials such as road salts, sea water or other chemicals from a vehicle.

CONCLUSION, RAMIFICATIONS AND SCOPE OF INVENTION

The reader will see that there are several novel features incorporated into the Rapid Vehicle Washing Process. First, the quantity of scouring liquid stored in the pressure vessels prior to its use is substantially the total quantity to be impinged upon the vehicle. Secondly, the time of filling and pressurizing the vessels is at least five times longer than the time required to discharge the liquid onto the vehicle; thus, a smaller mechanism for filling and pressurizing the vessels may be used and the vehicle may be washed in a shorter period of time. The time of discharging the liquid onto the vehicle will be less than twenty percent of the time required to fill the pressure vessels. When 45 seconds are required to fill the pressure vessels, the time of discharge onto the vehicle will be less than 9 seconds. Economy of operation can be tripled or quadrupled because the time of forceful impingement of a given volume of liquid upon the vehicle can be reduced by at least eighty percent without. When the cleansing agents and waxes used in the wash are accumulated and released as rapidly as the impingement water, the overall time of the wash can be reduced to equal the time required to accumulate the impingement water; this is a time reduction of more than seventy five percent over other state of the art washers. Conversely, a restricted water and/or electric supply can be utilized with an extended time between vehicles being washed.

Thus, my invention accomplishes an improved washing process with the versatility to adapt to site facilities. In addition, it will wash a vehicle in less than one forth the time the mechanisms of prior-art teachings are capable of, thereby improving the economy of operation while reducing the amount of electrical energy required to wash a vehicle, and improving air quality by reducing the time vehicles wait in line, with their engines idling, to enter the wash bay during a busy period.

While my above description contains many specificities, they should not be construed as limitations on the scope of the invention, but rather as an exemplification of the versatility of the process. Accordingly, the present specifications are to be considered as illustrative and the scope of the invention should be determined by the appended claims and their legal equivalents.

I claim:

1. A method for cleaning at least one stationary vehicle wherein selected external surfaces of said vehicle are treated with one or more cleansing agent solutions and water is impinged on said selected external surfaces to scour dirt and grime from said external surfaces, the improvement characterized by effectively contracting the duration of water impingement which comprises the steps of:
   (a) accumulating a predetermined volume of water in at least one water vessel to impinge on said external surfaces with a high pressure pump means;
   (b) pressurizing the accumulated water with at least one air receiver tank containing gas at a pressure of at least 200 pounds per square inch and said air receiver tank having a volume of at least four times the volume of said water;
   (c) opening a valve between said at least one water vessel and said air tank;
   (d) simultaneously opening a second valve outlet of at least one water vessel tank with an electronic controller means to impinge said pressurized water through plurality of nozzles on said selected external surfaces;
   (e) closing said valves when a sensor senses a low level of water in said at least one water tank to prevent a loss of said pressurized gas through said plurality of nozzles;
   (f) opening a third check valve between said at least one water vessel and said air receiver tank by;
   (g) accumulating water with a high pressure pump in said at least one water vessel and forcing gas from said at least one water tank through said check valve into said air receiver tank to a pressure at least 200 pound per square inch;
   (h) signaling when said at least one water tank is full;
   (i) opening a by pass means on a discharge side of said pump means to allow water from said pump means to bypass said at least one water vessel;
   (j) repeating steps (a)–(i) on any waiting vehicle.

2. The method of claim 1 further comprising the step of turning off said pump if no vehicle is waiting to be cleaned.

3. A method for cleaning at least one stationary vehicle wherein selected external surfaces of said vehicle are treated with one or more cleansing agent solutions and water is impinged on said selected external surfaces to scour dirt and grime from said external surfaces, the improvement characterized by effectively contracting the duration of water impingement which comprises the steps of:
   (a) accumulating a predetermined volume of water in at least one water vessel to impinge on said external surfaces with a high pressure pump means;

(b) pressurizing the accumulated water with at least one air receiver tank containing gas at a pressure of at least 200 pounds per square inch and said air receiver tank having a volume of at least four times the volume of said water;

(c) opening a valve between said at least one water vessel and said air tank, and simultaneously opening a second valve outlet of at least one water vessel tank with an electronic controller means to impinge said pressurized water through plurality of nozzles on said selected external surfaces;

(d) closing said valves when a sensor senses a low level of water in said at least one water tank to prevent a loss of said gas through said plurality of nozzles;

(e) opening a third valve in said at least one water vessel to vent said gas to the atmosphere;

(f) accumulating water with a high pressure pump in said at least one water vessel and forcing gas from said a t least one water tank through said check valve;

(g) signaling when said at least one water tank is full;

(h) closing said check valve;

(i) pressurizing said at least one air receiver tank to at least 200 psi with said gas;

(j) opening a by pass means on a discharge side of said pump means to allow water from said pump means to bypass said at least one water vessel;

(k) repeating steps (a)–(j) on any waiting vehicle.

4. The method of claim 3 wherein said at least one water vessel may be refilled by opening a controllable valve means communicated with a water main having sufficient capacity and pressure and closing said controllable valve when said at least one water vessel is full.

5. The method of claims 1 or 3 wherein said gas is air.

6. The method of claims 1 or 3 is used solely as an impingement rinsing process without being part of a complete vehicle washing program.

7. The method of claim 1 or 3 wherein said at least one water contains an elastomer means separating said gas from said water, thus minimizing said gas absorption by said water vessel.

8. The method of claim 1 or 3 wherein there is a fluid substance means impervious to gas separating said gas cavity therein from said water contained therein, thus minimizing said gas absorption by said water.

* * * * *